April 30, 1968 H. R. LEHMAN 3,381,239

HIGHLY RELIABLE OSCILLATOR-CLOCK UNIT CONTAINING DUPLICATED EQUIPMENT

Filed Aug. 3, 1966

INVENTOR
H. R. LEHMAN
BY Lucian C. Canepa
ATTORNEY 3,381,239
Patented Apr. 30, 1968

3,381,239

HIGHLY RELIABLE OSCILLATOR-CLOCK UNIT CONTAINING DUPLICATED EQUIPMENT

Harvey R. Lehman, New York, N.Y., assignor to Bell Telephone Laboratories Incorporated, Berkeley Heights, N.J., a corporation of New York Filed Aug. 3, 1966, Ser. No. 569,899
6 Claims. (Cl. 331—56)

ABSTRACT OF THE DISCLOSURE

An oscillator-clock unit is disclosed for generating clock waveforms having no phase or frequency discontinuities even in the face of component equipment failures. The unit comprises a "slave" oscillator which is phase locked with a "master" oscillator and a pair of weighted mixer circuits connected to the oscillators and each utilized for generating a "mixed" sinusoidal signal which never falls below a certain minimum amplitude regardless of the phase relationship between the two input signals. The disclosed arrangement provides for maintaining output signal continuity in a variety of components failure situations.

Figure 1:
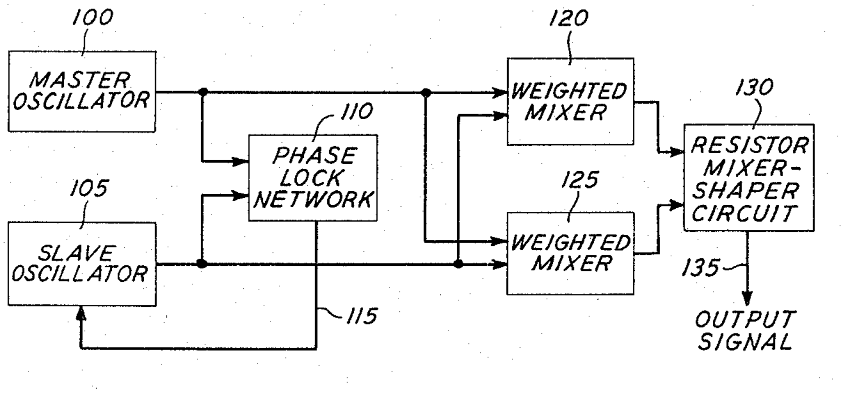

This invention relates generally to apparatus for generating clock pulses and more particularly to such apparatus having duplicated equipment.

Systems requiring accurate and reliable clock pulse generation apparatus range from simple synchronous circuits to highly complex switching and transmission systems. In digital transmission systems, for example, the digital receiver requires clocking or timing information in order to interpret the received signal sequence properly. This information is necessary for the proper sampling of received symbols and for the proper framing of characters (comprised of symbols) and messages (comprised of characters).

Various techniques have been utilized for increasing the reliability of clock pulse generation apparatus, one of the most common being to provide duplicated or redundant equipment. Thus if one piece of equipment fails, another may be activated to take its place. One of the main problems associated with this technique is that of maintaining continuous uninterrupted operation while making the transition from one piece of equipment (that which failed) to another piece (the redundant equipment).

Accordingly, it is an object of this invention to provide a highly reliable oscillator-clock unit having duplicated equipment.

It is another object of this invention to provide an oscillator-clock unit for generating clock waveforms having minimal phase or frequency discontinuities even in the face of component equipment failures.

These and other objects of the present invention are realized in a specific illustrative embodiment which comprises a master oscillator and slave oscillator for generating oscillatory signals, a phase lock network responsive to the oscillators for adjusting the phase of the slave oscillator output to correspond in some predetermined way to the phase of the master oscillator output, two weighted mixer circuits each connected to both oscillators for generating a "mixed" sinusoidal signal output which never falls below a predetermined minimum amplitude regardless of the phase or frequency of the two input signals, and a conventional resistor mixer-shaper circuit connected to each weighted mixer circuit. One of the two input signals to the weighted mixer circuits is attenuated so that the amplitude of each signal is "weighted" relative to the amplitude of the other signal. This novel oscillator-clock arrangement provides for maintaining an output of clock waveforms having limited frequency or phase discontinuities despite various combinations of component equipment failures.

It is a feature of this invention that duplicated weighted mixer circuits be utilized in conjunction with a master-slave oscillator configuration for generating oscillatory output signals having a predetermined minimum amplitude and for maintaining the oscillatory output with minimal phase or frequency discontinuities.

Figure 2A:
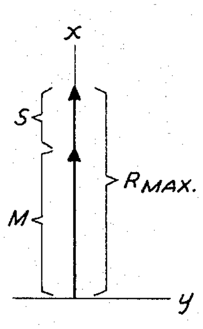
Figure 2B:
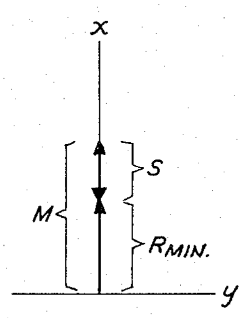
Figure 2C:
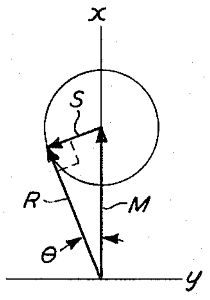

A complete understanding of the present invention and of the above and other objects, features and advantages thereof, may be gained from a consideration of the following detailed description of a specific illustrative embodiment presented hereinbelow in connection with the accompanying drawing, in which:

FIG. 1 is a block diagram of an oscillator-clock unit made in accordance with the principles of the present invention;

FIGS. 2*a*, 2*b* and 2*c* are phasor diagrams of the voltage inputs and the output of the weighted mixer circuits shown in FIG. 1.

Figure 3:
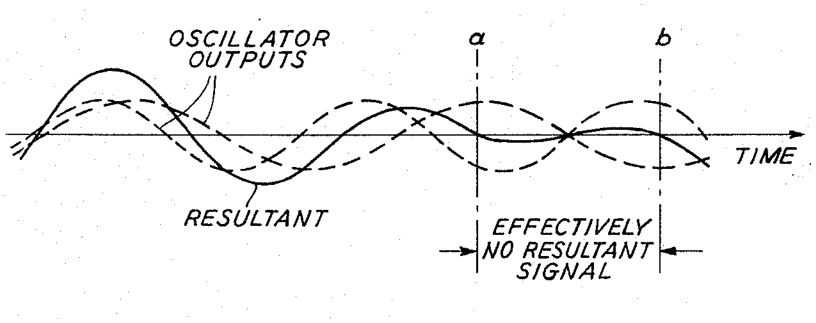

FIG. 3 is a graphical representation showing the addition of two oscillatory signals phasing in and out as a function of time.

The oscillator-clock unit shown in FIG. 1 includes a master oscillator 100 and a slave oscillator 105 each connected to a phase lock network 110 and two weighted mixer circuits 120, 125. The outputs of the mixer circuits are connected to a conventional resistor mixer-shaper circuit 130 which provides a single output on lead 135. The phase lock network 110 monitors the signal output of each oscillator and determines the phase difference between the signals. If the oscillators are in phase, then the phase lock network 110 applies a zero voltage via a lead 115 to the slave oscillator 105. If the phase of the slave oscillator 105 leads or lags that of the master oscillator 100, the phase lock network applies a positive or negative voltage respectively to the slave oscillator 105. The magnitude of the voltage is proportional to the phase difference between the oscillators. The slave oscillator, in response thereto, varies the frequency of its output to maintain the two signals in phase. Illustratively, the phase lock network 110 is a frequency discriminator of the general type disclosed in R. C. Webb Patent 2,415,468, issued Feb. 11, 1947. Conventional crystal oscillators may be employed for the master-slave oscillator configuration. The slave oscillator 105 is provided with a conventional frequency control network, so that the frequency of the oscillator 105 can be varied in response to control signals applied thereto from the phase lock network 110.

The oscillatory outputs from both oscillators are applied to the two weighted mixer circuits 120, 125. Each weighted mixer circuit combines or adds the two input signals to produce an oscillatory output signal which never falls below a certain predetermined minimum amplitude regardless of the phase relationship between the two input signals. This is accomplished by attenuating the input signal from one of the oscillators before adding it to the other input signal (i.e., "weighting" one input signal more than the other). Phasor representations of the resultant output signals of the weighted mixer circuits (and of the resistor mixer-shaper circuit 130 after simple mixing of the weighted mixer outputs) are shown in FIGS. 2*a*, 2*b* and 2*c*. FIG. 2*a* shows the resultant output ($R_{max.}$) when the two input signals (M representing the signal from the master oscillator 100 and S the signal from the slave oscillator 105) are in phase. This output signal is the maximum which can be obtained from the weighted mixer circuits. FIG. 2*b* shows the resultant output ($R_{min.}$) when the two input signals to the mixers 120 and 125 are 180° out of phase. Regardless of the phase difference between the two input signals, the output signal never falls below $R_{min.}$. FIG. 2*c* shows the resultant output (R) when the two input signals exhibit a random phase difference. The circle represents all possible resultant vector terminations, given any phase difference between the two input signals. As shown in FIG. 2*c*, the resultant (R) never varies in phase from the master oscillator input by more than $\theta$ degrees.

By properly choosing the degree of attenuation of the one oscillator output (the slave oscillator in this case), the angle $\theta$ can be made almost as small as desired. An illustrative weighted mixer circuit which may be utilized in the depicted oscillator-clock unit is described in F. E. De Motte Patent 3,139,530, issued June 30, 1964. More particularly, the De Motte patent discloses a transformer combination wherein the turns ratios of the transformers can be chosen so that the input signals are weighted to satisfy the requirements described above.

As implicit from above, if the phase lock network 110 fails, the weighted mixer circuits 120, 125 guarantee an oscillatory output having a fixed minimum resultant amplitude and a maximum phase shift of $\theta$ degrees (with respect to the reference phase of the master oscillator). If simple mixer circuits were provided rather than the weighted mixer circuits, then the failure of the phase lock network 110 could result in a frequency difference (and thus a phase difference) between the master and slave oscillators which, in turn, would cause loss of the oscillator-clock unit output during those intervals of time when the phase difference between the oscillator output signals was approximately 180°. This is illustrated in FIG. 3. In the interval between the vertical lines *a* and *b* of FIG. 3, the resultant output signal is effectively zero because the two oscillator outputs (dashed lines) are approximately 180° out of phase in this interval.

An additional advantage derived from the illustrated oscillator-clock unit configuration, in the case of a phase lock network failure, is that the resultant signal output from the weighted mixer circuits 120, 125 never varies in phase from the master or reference oscillatory signal by more than some predetermined number of degees $\theta$ (FIG. 2*c*). Thus, if it were desired to remove or disengage the slave oscillator 105 or if the slave oscillator failed following the failure of the phase lock network 110, an oscillatory output signal M differing no more than $\theta$ degrees from the signal R would be maintained. The value of $\theta$, of course, could be chosen so that this phase discontinuity in the oscillator-clock unit output would be inconsequential.

A variety of other sequences of component equipment failures can also be tolerated by the herein-described oscillator-clock unit. That is, such failures do not cause a disruption of or discontinuity in the oscillator-clock unit output signal. For example, if a single oscillator fails, followed by a failure in the phase lock network 110 and one weighted mixer circuit, the output waveform would be maintained free from any phase discontinuity. Also, a weighted mixer failure followed by a phase lock network failure and a slave oscillator failure would not disrupt the oscillator-clock unit output.

It is understood that the above-described oscillator-clock unit configuration is only illustrative of the application of the principles of the present invention. Other modifications and alternative arrangements may be devised by those skilled in the art without departing from the spirit and scope of the invention. For example, many of the advantages of the oscillator-clock unit discussed above can be obtained if only a single weighted mixer circuit is employed. On the other hand, if the weighted mixer circuits are prone to failure, more than two can be employed. In accordance with the principles of the present invention, it is also feasible to form an oscillator-clock unit having more than two oscillators and more than one phase locking network.

What is claimed is:

1. An oscillator-clock unit comprising a pair of oscillators, phase locking means connected to both of said oscillators, and weighted mixer circuit means connected to said oscillators for continuously maintaining oscillatory output signals despite failure of various components of said unit.

2. A combination as in claim 1 wherein said phase locking means in response to the signals from said oscillators applies appropriate frequency adjusting signals to one of said oscillators so as to maintain a predetermined phase relationship between the output signals of said oscillators.

3. A combination as in claim 2 wherein said weighted mixer circuit means comprises means for attenuating the output signal of one of said oscillators and for combining said attentuated signal with the output signal of the other of said oscillators so as to produce a resultant oscillatory signal having a predetermined minimum amplitude regardless of the phase relationship between the output signals of said oscillators.

4. Apparatus for maintaining oscillatory output signals having no phase discontinuities even upon failure of a component oscillator, said apparatus comprising a pair of oscillators, a phase lock network connected to both of said oscillators and at least one weighted mixer circuit connected to said oscillators.

5. In combination, a pair of oscillators both connected to a phase locking circuit, one of said oscillators being responsive to the output of said phase locking circuit for adjusting the frequency of its oscillatory signal so as to maintain a predetermined phase relationship between the output signals of said oscillators, and means connecting each of said oscillators to at least one weighted mixer circuit for combining the output signals of said oscillators to obtain a resultant signal whose amplitude never falls below a predetermined minimum.

6. In combination, *n* oscillators, *n* being any number greater than one, $n-1$ phase locking circuits each connected to a pair of said oscillators for determining the phase difference between the oscillatory output signals thereof and for adjusting the frequency of the output of one of said pair so as to maintain a predetermined phase relationship between said pair of outputs, and at least one weighted mixer circuit connected to said *n* oscillators for combining the oscillatory output signals thereof to obtain a resultant signal whose amplitude never falls below a predetermined minimum.

References Cited

UNITED STATES PATENTS

| | | | |
|---|---|---|---|
| 3,139,530 | 6/1964 | De Motte | 307—75 |
| 3,210,685 | 10/1965 | Zepp | 331—56 X |
| 3,242,442 | 3/1966 | Ishimoto et al. | 331—56 X |

ROY LAKE, *Primary Examiner.*

NATHAN KAUFMAN, *Examiner.*

S. H. GRIMM, *Assistant Examiner.*